Patented June 23, 1953

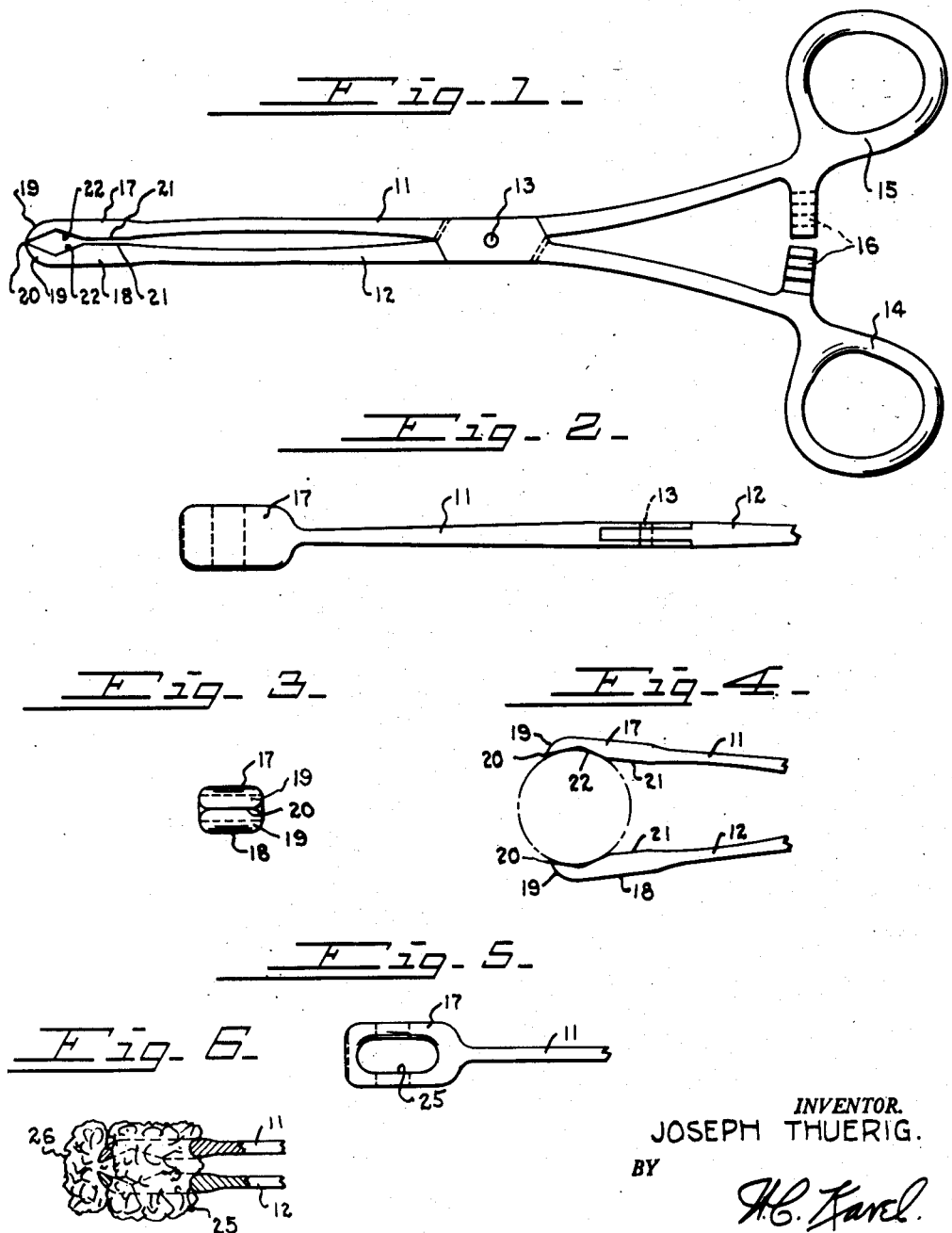

2,642,871

UNITED STATES PATENT OFFICE 2,642,871

FORCEPS

Joseph Thuerig, Cincinnati, Ohio

Application May 12, 1951, Serial No. 225,987

3 Claims. (Cl. 128—321)

This invention relates to an improved forceps primarily useful in lifting syringes from a sterilizer and also useful in applying sponges in surgical operations.

Heretofore the forceps in general use had an eye in the tongs to hold a wad of cotton for sponging operations and these same forceps were used to pick up syringes from the sterilizer, however it was necessary to engage the collar of the syringe in this eye in order to hold the syringe requiring extreme skill in the handling of the forceps. With my improved forceps the tongs are so designed to engage the tubular syringe any place along its length to firmly hold the syringe in the tongs.

The object of my invention is to provide a pair of forceps with tongs so designed to firmly grip tubular objects.

A further object is to provide the tongs with a forward gripping edge.

A still further object is to provide the tongs with smooth external edges.

My invention will be further readily understood from the following description and claims, and from the drawings, in which latter:

Fig. 1 is a side view of my improved forceps.

Fig. 2 is a plan view of the same, partly broken away.

Fig. 3 is an end view of the tongs.

Fig. 4 is a side view showing the tongs engaging a tubular object, and partly broken away.

Fig. 5 is a plan view of a modification of the tongs.

Fig. 6 is a detail section of the same, showing a wad of cotton held in the tongs.

My improved forceps comprise the usual pivoted members 11 and 12 pivoted at 13 and provided with finger grips 14 and 15. The forceps may be provided with locking ratchets 16.

My improvement is concerned with the engaging tongs which comprises a pair of flat members 17 and 18 extending from the members 11 and 12 and having the outer edges thereof rounded to present a smooth surface on the tongs. The forward edges of the tongs are rounded as at 19 to form a curved portion from the gripping edge to the outer surface of the tongs to permit either of the tongs to easily slide under a tubular object. A grip contact edge 20 on each tong permits the picking up of minute objects as the extending faces 21 of the tongs are spaced slightly apart when the outer edges of the tongs engage each other. Directly behind the engaging contact edges 20 are inverted obtuse angular meeting faces 22 on each tong extending cross-wise of the tongs to engage tubular objects and firmly hold such objects between the tongs.

In Figs. 5 and 6, I have shown a modified form of the tongs similar to the tongs shown in the preferred form except that each tong is provided with a cut out portion 25 forming vertical apertures in the tongs to lighten the tongs and also to more firmly hold a wad of cotton 26 when the forceps are used for sponging etc.

From the foregoing it will be apparent that my improved forceps are extremely useful in lifting tubular objects such as syringes from sterilizers and can also be used for sponging purposes as the tongs will readily hold a wad of cotton. The smooth curved edges of the tongs aid in applying sponging operations.

Having thus fully described my invention, what I claim as new and desire to secure by Letters Patent, is:

1. A forceps comprising a pair of pivoted members, finger supporting means at one end of said members, tongs at the other end of said members, said tongs having forward line gripping edges, and said tongs provided with transverse inverted obtuse angular meeting faces opposed to each other and extending rearwardly from said line gripping edges.

2. A forceps comprising a pair of pivoted members, finger supporting means at one end of said members, tongs at the other end of said members, said tongs having forward line gripping edges, said tongs being curved from the said gripping edge to the outer surface of said tongs, and said tongs provided with transverse inverted obtuse angular meeting faces opposed to each other and extending rearwardly from said line gripping edges.

3. A forceps comprising a pair of pivoted members, finger supporting means at one end of said members, tongs at the other end of said members, said tongs having forward gripping edges, said tongs being curved from the said gripping edge to the outer surface of said tongs, said tongs provided with transverse inverted obtuse angular meeting faces opposed to each other, and said tongs provided with vertical apertures extending through said inverted obtuse angular meeting faces.

JOSEPH THUERIG.

References Cited in the file of this patent

UNITED STATES PATENTS

| Number | Name | Date |
| --- | --- | --- |
| Re. 22,857 | Ogburn | Mar. 25, 1947 |
| 424,689 | Reimers | Apr. 1, 1890 |
| 1,008,176 | Menzel | Nov. 7, 1911 |
| 1,243,434 | McDermott | Oct. 16, 1917 |
| 1,261,357 | Bursell | Apr. 2, 1918 |

FOREIGN PATENTS

| Number | Country | Date |
| --- | --- | --- |
| 4,688 | Great Britain | of 1893 |